(12) United States Patent
Demirli et al.

(10) Patent No.: US 10,699,482 B2
(45) Date of Patent: *Jun. 30, 2020

(54) REAL-TIME IMMERSIVE MEDIATED REALITY EXPERIENCES

(71) Applicant: MINDHIVE INC., New York, NY (US)

(72) Inventors: Oya Demirli, New York, NY (US); George Dalke, Claremont, NH (US)

(73) Assignee: MINDHIVE INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,121

(22) Filed: Sep. 27, 2018

(65) Prior Publication Data

US 2019/0026945 A1 Jan. 24, 2019

Related U.S. Application Data

(63) Continuation of application No. 14/790,641, filed on Jul. 2, 2015, now Pat. No. 10,089,785.

(60) Provisional application No. 62/075,583, filed on Nov. 5, 2014, provisional application No. 62/028,940, filed on Jul. 25, 2014.

(51) Int. Cl.
| | |
|---|---|
| *G06T 19/00* | (2011.01) |
| *G08B 13/196* | (2006.01) |
| *H04S 7/00* | (2006.01) |
| *G06F 3/01* | (2006.01) |
| *G06T 15/10* | (2011.01) |
| *H04S 5/00* | (2006.01) |

(52) U.S. Cl.
CPC ............ *G06T 19/003* (2013.01); *G06F 3/011* (2013.01); *G06F 3/015* (2013.01); *G06T 15/10* (2013.01); *G06T 19/006* (2013.01); *G08B 13/19641* (2013.01); *H04S 5/00* (2013.01); *H04S 7/303* (2013.01); *H04S 2400/11* (2013.01)

(58) Field of Classification Search
None
See application file for complete search history.

(56) References Cited

U.S. PATENT DOCUMENTS

| 5,850,352 A * | 12/1998 | Moezzi | ................ H04N 13/139 345/419 |
| 2002/0113805 A1* | 8/2002 | Li | ........................ G06F 3/04815 345/649 |

(Continued)

*Primary Examiner* — Ryan M Gray
(74) *Attorney, Agent, or Firm* — Brown Rudnick LLP

(57) ABSTRACT

The invention relates to creating real-time, immersive mediated reality environments using real data collected from a physical event or venue. The invention provides a virtual participant with the ability to control their viewpoint and freely explore the venue, in real time by synthesizing virtual data corresponding to a requested virtual viewpoint using real images obtained from data collectors or sources at the venue. By tracking and correlating real and virtual viewpoints of virtual participants, physical objects, and data sources, systems and methods of the invention can create photo-realistic images for perspective views for which there is not physically present data source. Systems and methods of the invention also relate to applying effect objects to enhance the immersive experience including virtual guides, docents, text or audio information, expressive auras, tracking effects, and audio.

20 Claims, 10 Drawing Sheets

(56) References Cited

U.S. PATENT DOCUMENTS

| | | | | |
|---|---|---|---|---|
| 2004/0104935 | A1* | 6/2004 | Williamson | G06F 3/012 |
| | | | | 715/757 |
| 2004/0138901 | A1* | 7/2004 | Krieger | G06Q 10/02 |
| | | | | 705/1.1 |
| 2007/0229396 | A1* | 10/2007 | Rajasingham | G06F 3/013 |
| | | | | 345/8 |
| 2007/0244634 | A1* | 10/2007 | Koch | G01C 21/00 |
| 2009/0238378 | A1* | 9/2009 | Kikinis | H04N 13/398 |
| | | | | 381/92 |
| 2010/0194863 | A1* | 8/2010 | Lopes | G06T 19/00 |
| | | | | 348/50 |
| 2012/0194706 | A1* | 8/2012 | Kwak | H04N 1/32101 |
| | | | | 348/239 |
| 2013/0155058 | A1* | 6/2013 | Golparvar-Fard | G06T 19/006 |
| | | | | 345/419 |
| 2013/0194305 | A1* | 8/2013 | Kakuta | G06T 19/006 |
| | | | | 345/633 |
| 2013/0222369 | A1* | 8/2013 | Huston | G06T 17/00 |
| | | | | 345/419 |
| 2014/0091897 | A1* | 4/2014 | Lemmey | A61B 5/165 |
| | | | | 340/3.1 |
| 2014/0340404 | A1* | 11/2014 | Wang | G06T 15/20 |
| | | | | 345/427 |
| 2015/0035862 | A1* | 2/2015 | Fischer | G06T 19/006 |
| | | | | 345/633 |

* cited by examiner

REAL-TIME IMMERSIVE MEDIATED REALITY EXPERIENCES

CROSS-REFERENCE TO RELATED APPLICATIONS

This application is a continuation of U.S. Nonprovisional patent application Ser. No. 14/790,641 filed Jul. 2, 2015 which claims priority to, and the benefit of, both U.S. Provisional Patent Application Ser. No. 62/028,940, filed Jul. 25, 2014, and U.S. Provisional Patent Application Ser. No. 62/075,583, filed Nov. 5, 2014, the contents of each of which are incorporated by reference.

FIELD OF THE INVENTION

The invention generally relates to a tool for creating real-time, interactive, mediated reality environments by using data collected from a real-world location.

BACKGROUND

Recent advances in technology have brought fast and relatively inexpensive worldwide communication to average consumers. Individuals can chat, call, text, video chat, or send data, almost instantaneously to other individuals around the world. People are able to communicate and form relationships with an unprecedented amount and variety of other individuals. In turn, they are able to access a wide variety of previously unknown cultures and experiences on a daily basis. With the ubiquitous mobile telephone, an individual can see and hear remote locations and share images, audio, video, and ideas with friends or complete strangers via social media. This technology has allowed individuals to connect to other people and places unimaginable just a short time ago. However, the quality of these connections is lacking and the wide array of superficial experiences (e.g., unrealistic, computer-generated environments) provided by current technology cannot provide deeper, realistic, shared experiences. The allure of these superficial new experiences however, can distract individuals from the pursuit of deeper human interaction.

Modern communication technologies are obtrusive and stand in the way of more meaningful and realistic interactions and experiences. As people become more reliant on and involved in their on-line, "digital" lives, they inevitably become more detached from the real world and real experiences. Current technology limits users to alternatively producing or viewing shared content using tools and interfaces which form barriers between users and detract from a more natural experience. Remote viewers cannot generally control their own experience, and certainly not in real world venues and events in a real-time, organic manner. They must instead rely on other individuals to produce and share content from a venue. Meanwhile, individuals at the physical event, producing shared content, are engrossed in their mobile devices, creating and sharing video, texts, audio, chats, images, social media posts, and other superficial content instead of experiencing the event. In both cases, the viewer and the producer remain separated from meaningful experiences by obtrusive layers of technology. The promise of current communication technology has led more and more people to spend more and more time in their virtual, on-line lives but the limitations of that technology are having a deleterious effect on people's ability to engage in meaningful experiences and interactions with the surrounding world and their peers.

Techniques including 3-dimensional (3D) displays and virtual reality headsets are known and used to create more realistic videos, images and environments. These techniques are limited in application however. Representations of real events and venues still require a producer, controlling the viewpoint at the venue and the viewer or virtual participant cannot control the experience in an organic manner. Virtual computer-generated environments are known and can provide more viewpoint control to the virtual participant. Such environments are seen in massively multi-player online worlds and games and allow a user to experience a 3D virtual reality and interact with other users in the virtual space. These experiences are, however, limited to computer generated worlds and objects and cannot allow users to remotely experience real-world places and events, in real time.

The use of multiple cameras, simultaneously capturing an object from multiple angles is also known and can be used to provide a viewer with the ability to view images of the object, in the single captured instance, from multiple viewpoints of their choosing. This technique has been used in movies and sporting events to provide a viewer with the sensation of flying around an object such as a football player in the act of making a catch. Virtual viewpoints are extrapolated from the image information captured at each camera and are used to smooth the transitions between images and allow a user to view the scene from an angle at which there is no camera. This technique requires post production work and can only be executed with multiple expensive, fixed position cameras set up at optimal viewpoints and angles. Additionally, this technique cannot provide an immersive experience because it cannot be executed in real-time, most often does not allow for end-user control of the viewpoint, and is limited to multiple viewpoints of a single captured moment in time as opposed to live-action video.

SUMMARY

The invention generally relates to tools to create immersive, mediated reality environments using both live and computer produced images, sounds, graphics, and/or video, among other data which allow a viewer to remotely control a virtual viewpoint and interact with live venues and events. By providing an experience which more closely resembles reality, wherein a virtual participant can simulate moving around a live venue, seeing actual events, as they happen, hearing live sounds, and interacting with other users who may be either virtually or physically present at the venue or event. The invention provides an immersive mediated reality experience of real venues and events, in real time, that can be controlled by the virtual participant as if they were physically present themselves. The invention strips away many of the obtrusive layers of technology present in current communication techniques and provides more seamless, natural control of an experience with the realism of live action two-dimensional (2D) or 3D video, sound, images and more.

Systems and methods of the invention use data (e.g., images, video, audio, location, orientation, and other sensors) collected at a real venue by dedicated data collectors as well as from computing devices of users at the venue to build a 3D computer model of the physical space. The location and orientation at a specific time (i.e., viewpoint) of real participants and data collectors (including the computing devices of real participants) at the physical space can also be received and recorded at the server computer system. This viewpoint information may be referred to herein as a user's space/time viewpoint trajectory (STVT). The server computer system may create and provide virtual viewpoints, in real-time, as requested by computing devices of virtual participants by extrapolating data from data collectors with real viewpoints that intersect with the requested virtual viewpoint. The virtual participant's virtual viewpoint can therefore be presented even if there is not a data collector with a real viewpoint exactly corresponding to the requested virtual viewpoint. The virtual participant is accordingly free to choose almost any viewpoint as they move, virtually around the real venue or event, providing a more realistic, immersive, and rewarding experience.

Data collectors may include computing devices (e.g., mobile devices such as smart phones and tablets, wearable devices, 3D headsets, or augmented reality devices) of users physically present at the venue and any sensor (e.g., a still or video camera, a microphone, an accelerometer, gyroscope, Global Positioning System (GPS) or other location sensor, or a vibration, temperature, pressure, light, radar, wind, sonar, infra-red, or other sensor) at the physical venue capable of collecting and transmitting information about the venue to the computer server device over a communications network. In certain embodiments, the server computer system may recruit live data feeds from the computing devices of real participants at the venue, thereby enabling ad-hoc creation of immersive environments without requiring extensive planning and preparation or limiting immersive experiences to certain preselected and prepared venues (e.g., sporting arenas or concert venues). The systems and methods of the invention can permit individual users to set up a real-time, immersive, mediated reality event or venue in almost any location (e.g., on a hike in a park or at a party).

A virtual participant can be any individual experiencing a venue or event through an immersive, mediated reality environment on a computing device. A virtual participant may be in a remote location relative to the physical venue or can be at the physical venue. Systems and methods of the invention can provide effect objects (described below) which can augment and improve the quality of a real participant's experience. For example, an individual stuck at the back of a crowd at a concert, unable to see the action on stage, may obtain a better view as a virtual participant, untethered from the physical limitations of the real event. Real viewpoint information may include latitudinal and longitudinal coordinates, field of view, elevation, and orientation of a data collector (e.g., the direction that the data collector is facing and its angle). Virtual viewpoints can also comprise latitudinal and longitudinal coordinates, elevation, field of view, and orientation which correspond to an actual location and orientation in the real, physical world.

In certain embodiments, a server computer system may receive information from a computing device of a virtual participant and may compute a virtual STVT or viewpoint for that user where the virtual viewpoint. In some instances, the virtual viewpoint may be determined by the virtual participant's computing device and, in turn, sent to the server computer system as a request for an image corresponding to that viewpoint. A virtual viewpoint may be selected by a virtual participant through a variety of interfaces including computing input devices such as a keyboard, mouse, touchscreen, gestural device, microphone, display headsets, or other wearable devices. Virtual viewpoint selection can entail entering an address or venue name into a computing device or may include moving a computing device such as a mobile telephone or display headset wherein the virtual viewpoint moves according to the movements of the computing device (e.g., a 3-d visor where a virtual participant's head and eye movements are tracked and the virtual viewpoint changes to match where the virtual participant is looking). The server computer, upon receiving virtual viewpoint information from the computing device of a virtual participant, may then determine if there are data collectors at the real venue with real viewpoints that intersect with the requested virtual viewpoint.

Real-time data may include real-time biometric information or biometric data for real and/or virtual participants including, for example, temperature, heart rate, breathing rate, pupil dilation, perspiration rate, brain activity (e.g., EEG monitoring), or bodily concentration of an analyte. Analytes may include oxygen (e.g., through pulse oximetry), glucose (e.g., through known glucose monitors), alcohol, THC or other drugs and/or drug markers. Analyte concentration may be measured in bodily fluids such as sweat, blood, saliva, or urine or in a real or virtual participant's breath (e.g., a breathalyzer). Sensors for measuring these parameters are known. Sensors for collecting real-time biometric information from real and/or virtual participants may be in communication with computing devices of the participants and/or may be in direct communication with the server computer system.

In certain embodiments, the server computer system tracks the real-time viewpoint of each data collector at a venue and may pull real-time data (e.g., real-time images, video, and audio) from one or more of the data collectors with real viewpoints that intersect with the requested virtual viewpoint. In various embodiments, the server computer system may be continuously receiving real-time data from all data collectors at a venue or, in other embodiments, may only receive real-time data from data collectors as needed to create a specific real-time virtual image requested by a virtual participant through their computing device. The server computer system can then use this information to calculate the pixel information (e.g., color and light values) for an image that would be visible from the virtual viewpoint and create that virtual image based on pixel information from the real-time data it has received from data collectors. This process can be implemented in real-time so that a virtual participant may request and observe (e.g., see, hear, and feel) a live data feed at a remote event from virtual viewpoints even though there is no data collector with the equivalent real viewpoint.

In some embodiments, a computer server system may supplement virtual pixel information or determine unknown virtual pixel information by estimating information based on surrounding pixels with more robust information from real-time images obtained from intersecting real viewpoints. In some instances, the computer server system may access archived images from real viewpoints which intersect the requested virtual viewpoint and use archived pixels from those archived images to supplement virtual pixels for which there is insufficient information from available real-time images.

Systems and methods of the invention may also include further processing steps which may enhance the virtual image that is delivered to a virtual participant's computing device. Examples of processing steps include applying digital anti-aliasing filters, 2D or 3D digital filters, synchronizing data feeds (e.g., audio, video, or image feeds) from data collectors, compensating for compression and encoding artifacts, correction of object distortions caused by compiling real-time images from diverse real viewpoint angles. Additional processing steps may include separating luminous and color data before processing each data set separately. In some instances, processing steps may include using correlation, adaptive functions, and geometric analysis to align and verify viewpoint information and to correlate real pixels (i.e., pixel components of real-time images from data collectors) and virtual pixels (i.e. pixel components of real-time virtual images supplied to virtual participants).

Systems and methods of the invention may use effect objects (e.g., computer generated objects and effects) to improve and augment an immersive, mediated reality experience. Such effect objects may be, for example, real, synthesized, or computer generated and can include avatars which can indicate the presence, identity, location, and/or orientation of a user virtually present at a venue or event among other information. In immersive environments of the invention, avatars of virtual participants or the image of users physically present at the venue may undergo transformations using effect objects. For example, artificial auras may emanate from the avatars of virtual participants or from the images of real participants. These auras may be computer generated graphics which are visible in the immersive environment and may be manipulated by the individual expressing the aura to indicate his or her mood, emotion, identity, or preferences, for example. A group of similar auras may coalesce into a cloud in the immersive environment which can be used for crowd voting or to locate groups of like individuals.

Transformations can include any alteration to the image of a virtual or real participant, including, for example, alterations to their size or proportions; transformation to resemble other individuals, animals, characters, or creatures; and/or alterations to image properties such as contrast, focus, color, or brightness. In some embodiments, transformations may include additions to the images of real or virtual participants, including images of tears or sweat, or may include alterations to the image's posture or facial expression.

Transformations may be initiated by input from a real or virtual participant through a computing device including selection of a particular transformation, expression, mood, or sentiment through an input/output device or may occur in response to real-time biometric data obtained from real and/or virtual participants. For example, an elevated heart rate or blood alcohol level, may result in the expression of an aura of a particular color or other transformation intended to represent a physical state of the participant or user being represented.

Other effect objects may include docents, kiosks, agents, or guides which can be artificial effects or may be virtual representations of real individuals. These effects may appear to provide information about a venue, an event, an object, or a product. These effects can also facilitate the purchase of products seen in the immersive environment. For example, a virtual participant, viewing a concert may consult with an agent effect object for information about a band performing at the concert, or to download music from the band, purchase band merchandise, or facilitate virtual meetings with band members. Effect objects may include entire virtual environments (e.g., artificial buildings) which are overlaid onto the immersive environment and may be interacted with and explored in the same manner as the real objects in the immersive environment. For example, a virtual participant may step into an effect object library placed in the middle of a festival in a real world field and browse through virtual books for information before leaving walking out of the effect object library into a real-world concert as it is happening.

Effect objects can, for example, be real objects which are tracked in the immersive environment in order to support interactive experiences with real objects by virtual participants. For example, a guitar being used by an artist at a live venue may be tracked as an effect object so that a virtual participant, experiencing the concert in an immersive environment may be able to purchase or obtain information about the guitar by indicating interest in the effect object (e.g., by clicking on, looking at, zooming in on, gesturing toward, or using an touchscreen).

In certain embodiments, real-time virtual images, because they do not require data collectors at the real viewpoint equivalent to the requested virtual viewpoint, may enable views which would be physically impossible to obtain real images from. For example, in some embodiments, virtual participants may explore an immersive environment from a third party perspective, viewing their real body or their virtual avatar from a third-party point of view as they interact with the immersive environment. Virtual participants may, in certain embodiments, pass through or look through effect and real objects. Additionally, processing may overcome adverse lighting conditions or other issues by enhancing real-time images to provide real-time virtual images of viewpoints where a human eye at the equivalent real viewpoint would be unable to perceive the environment around it.

Images, as referred to herein may be understood to include video in that video is made up of multiple images taken at slightly progressive times. Multiple real-time images may be captured, created, and displayed in chronological order to create real-time video. As noted earlier, data collectors may collect a variety of sensors capable of collecting a variety of data types including, for example, still or video cameras, microphones, accelerometers, GPS or other location sensors, or vibration, temperature, pressure, light, radar, wind, sonar, infra-red, or other sensors. The system and methods of the invention, as applied to images, may also include receiving real data from any of the aforementioned sensors and creating real-time virtual data of the equivalent type which corresponds to a requested virtual viewpoint. The computing device of a virtual participant may, where possible, output the real-time virtual data (e.g., play audio over speakers or simulate vibrations through haptic output devices including clothing). In an exemplary embodiment, real-time virtual images (or video comprising multiple images) are supplemented by real-time virtual audio. Audio may be recorded and reproduced in a variety of formats including, mono, stereo, surround-sound, ambient, or directional. Audio may also be processed or enhanced in order to reduce distortion or to highlight certain sound sources (e.g., increasing the relative volume on an artist at a concert and decreasing the relative volume of crowd noise). Virtual participants may also contribute to audio in an immersive environment through audio recording devices coupled to their computing devices. For example, the cheering of a virtual participant can be overlaid onto the audio being recorded at a live venue. In certain embodiments the server may coalesce individual noises and sounds into a single equivalent background noise or murmur, this can help to diminish unwanted overstimulation caused by too many audio inputs.

In certain embodiments, virtual viewpoints may be requested for a selected time (e.g., an hour, day, or week prior to current time) as opposed to being real-time. In embodiments where real-time images and other real-time data are collected and stored in memory along with time information for each piece of data, a server computer system of the invention may provide historical virtual images and other data to create a historical immersive environment with which a virtual participant can interact in the manner described for real-time immersive environments. In certain embodiments, a virtual participant can backtrack through their own or another participant's trail of previous viewpoints to revisit a viewpoint.

In certain embodiments, a user may select one or more real objects, effect objects, or a combination thereof from either real-time or historical immersive environments for rendering in 2D or 3D images using conventional 2d printing techniques or using known 3d printing technologies.

In some embodiments, a server computer system may determine a second, stereoscopic virtual viewpoint corresponding to a virtual viewpoint wherein real-time virtual images corresponding to each of the virtual viewpoints may constitute a stereoscopic image. The virtual viewpoint and stereoscopic virtual viewpoint may approximate the position of a pair of human eyes in relation to each other.

Server computer systems of the invention generally include at least a processor coupled to a non-transitory, tangible memory. Similarly, computing devices of the invention generally include at least a processor coupled to a non-transitory, tangible memory. Systems and methods of the invention contemplate that the operations described as being performed by the server computer system could also be performed by computing devices of users including data collectors or virtual participants in a distributed computing system.

According to systems and methods of the invention, computing devices, data collectors, and server computer systems may be in communication with each other through a communication network. A communication network may include, for example, a local area network, a wide area network, the internet, a mobile telecommunications network, or a combination thereof.

In certain aspects, the invention provides a method of creating a mediated reality environment. The method includes receiving, in real-time, at a server computing system comprising a processor coupled to a tangible, non-transitory memory, real viewpoint information for one or more data collectors located at a venue; receiving, at the server, a virtual viewpoint from a computing device of a virtual participant, said computing device comprising a processor coupled to a tangible, non-transitory memory; receiving, at the server, one or more real-time images from the one or more data collectors where the one or more data collectors have a real viewpoint which intersects the virtual viewpoint, said one or more real-time images comprising a plurality of real pixels; creating, using the server's processor, a real-time virtual image comprising a plurality of virtual pixels and corresponding to the virtual viewpoint by using pixel information from the one or more real-time images; and causing the computing device of the virtual participant to display the real-time virtual image.

In certain embodiments, methods of the invention may include the steps of: identifying, using the server's processor, one or more archived images comprising a plurality of archived pixels, where the archived images having a corresponding real viewpoint which intersects with the virtual viewpoint; retrieving one or more of the archived pixels; using the one or more archived pixels to supplement the real-time virtual image using the server's processor; and causing the computing device of the virtual participant to display the supplemented real-time virtual image. One or more data collectors may comprise a microphone and steps of the method may include receiving, at the server, real-time audio data from the microphone; correlating the real-time audio data with the real viewpoint information for the data collector that generated it; creating, using the server's processor, real-time virtual audio corresponding to the virtual viewpoint; and causing the computing device of the virtual participant to emit the real-time virtual audio.

In certain embodiments, the one or more data collectors may comprise a computing device of a physical participant. The one or more data collectors may comprise an optical sensor. In various embodiments, the real viewpoint information and the virtual viewpoint comprise a latitudinal coordinate, a longitudinal coordinate, an orientation and a field of view. In certain embodiments, methods may include determining a stereoscopic virtual viewpoint based on the virtual viewpoint in order to provide a plurality of perspectives that approximate a human's natural binocular vision; creating a stereoscopic real-time virtual image corresponding to the stereoscopic virtual viewpoint; and causing the computing device of the virtual participant to simultaneously display the real-time virtual image and the stereoscopic real-time virtual image.

In some embodiments, the real-time virtual image may be a 3-dimensional image. The real-time virtual audio may include a plurality of channels. Methods of the invention may include the steps of creating an effect object; assigning a virtual location to the effect object which corresponds with a physical location at the venue; and where the virtual location is observable from the virtual viewpoint, overlaying the effect object onto the real-time virtual image. In various embodiments, the effect object may comprise an image of a real object or a computer generated image; may be generated by the virtual participant; may comprise a virtual representation of a virtual participant; may alter the virtual viewpoint or the real-time virtual image; or may be manipulated by the virtual participant.

In certain embodiments, the virtual viewpoint may be manipulated through movement of the computing device of the virtual participant. Methods of the invention may include the step of processing the one or more real-time images using the server's processor to enhance a feature of the one or more real-time images. In certain embodiments, the feature may be selected from the group consisting of resolution, color, brightness, contrast, signal to noise ratio, smoothness, edge preservation, luminosity, shape, pattern, and dynamic range. The server's processor may comprise a distributed computing system.

Methods of the invention may include receiving real-time biometric data for a virtual participant or a real participant from a biometric sensor wherein the effect object is determined by the real-time biometric data. The real-time biometric data may be selected from the group consisting of temperature, heart rate, breathing rate, pupil dilation, brain activity, and bodily concentration of an analyte. The analyte may be selected from the group consisting of oxygen, carbon dioxide, glucose, alcohol, and THC. Methods may further comprise creating, from the real-time virtual image, a 3D printing computer file readable by a 3D printer to render at least a portion of the real-time virtual image. In certain embodiments, methods may include creating, from the effect object, a 3D printing computer file readable by a 3D printer to render at least a portion of the effect object.

In certain aspects, the invention provides a system for creating a mediated reality environment where the system comprises a server computing system comprising a processor coupled to a tangible, non-transitory memory. The system is operable to receive, in real-time, real viewpoint information for one or more data collectors located at a venue; receive a virtual viewpoint from a computing device of a virtual participant, said computing device comprising a processor coupled to a tangible, non-transitory memory;

receive one or more real-time images from the one or more data collectors where the one or more data collectors have a real viewpoint which intersects the virtual viewpoint, said one or more real-time images comprising a plurality of real pixels; create, using the server's processor, a real-time virtual image comprising a plurality of virtual pixels and corresponding to the virtual viewpoint by using pixel information from the one or more real-time images; and cause the computing device of the virtual participant to display the real-time virtual image.

In certain embodiments systems of the invention may be operable to identify, using the server's processor, one or more archived images comprising a plurality of archived pixels, said archived images having a corresponding real viewpoint which intersects with the virtual viewpoint; retrieve one or more of the archived pixels; use the one or more archived pixels to supplement the real-time virtual image using the server's processor; and cause the computing device of the virtual participant to display the supplemented real-time virtual image.

In various embodiments, the one or more data collectors may comprise a microphone, and the system may be further operable to receive real-time audio data from the microphone; correlate the real-time audio data with the real viewpoint information for the data collector that generated it; create, using the server's processor, real-time virtual audio corresponding to the virtual viewpoint; and cause the computing device of the virtual participant to emit the real-time virtual audio. One or more of the one or more data collectors may comprise a computing device of a real participant or an optical sensor. The real viewpoint information and the virtual viewpoint may comprise a latitudinal coordinate, a longitudinal coordinate, a field of view, and an orientation. Systems of the invention may be further operable to determine a stereoscopic virtual viewpoint capable of being combined with the virtual viewpoint in order to create a stereoscopic viewpoint; create a stereoscopic real-time virtual image corresponding to the stereoscopic virtual viewpoint; and cause the computing device of the virtual participant to simultaneously display the real-time virtual image and the stereoscopic real-time virtual image. The real-time virtual image may be a 3-dimensional image. The real-time virtual audio may include a plurality of channels. Systems may be further operable to create an effect object; assign a virtual location to the effect object which corresponds with a physical location at the venue; and where the virtual location is observable from the virtual viewpoint, overlay the effect object onto the real-time virtual image.

The effect object may comprise an image of a real object or a computer generated image; may be generated by the virtual participant; may comprise a virtual representation of a virtual participant; or may be manipulated by the virtual participant. In certain embodiments, the virtual viewpoint may be manipulated through movement of the computing device of the virtual participant. Systems may be further operable to process the one or more real-time images using the server's processor to enhance a feature of the one or more real-time images. In various embodiments, the feature may be selected from the group consisting of resolution, color, brightness, contrast, signal to noise ratio, smoothness, edge preservation, luminosity, and dynamic range. The server's processor may comprise a distributed computing system comprising a plurality of computing device processors in communication with each other through a communication network. In various embodiments, systems may be further operable to receive real-time biometric data for a virtual participant or a real participant from a biometric sensor wherein the effect object is determined by the real-time biometric data.

In certain embodiments, the real-time biometric data is selected from the group consisting of temperature, heart rate, breathing rate, pupil dilation, brain activity, and bodily concentration of an analyte. The analyte may be selected from the group consisting of oxygen, carbon dioxide, glucose, alcohol, and THC. In some embodiments, systems may be further operable to create, from the real-time virtual image, a 3D printing computer file readable by a 3D printer to render at least a portion of the real-time virtual image. In certain embodiments, systems of the invention may be further operable to create, from the effect object, a 3D printing computer file readable by a 3D printer to render at least a portion of the effect object.

DETAILED DESCRIPTION

Figure 1:
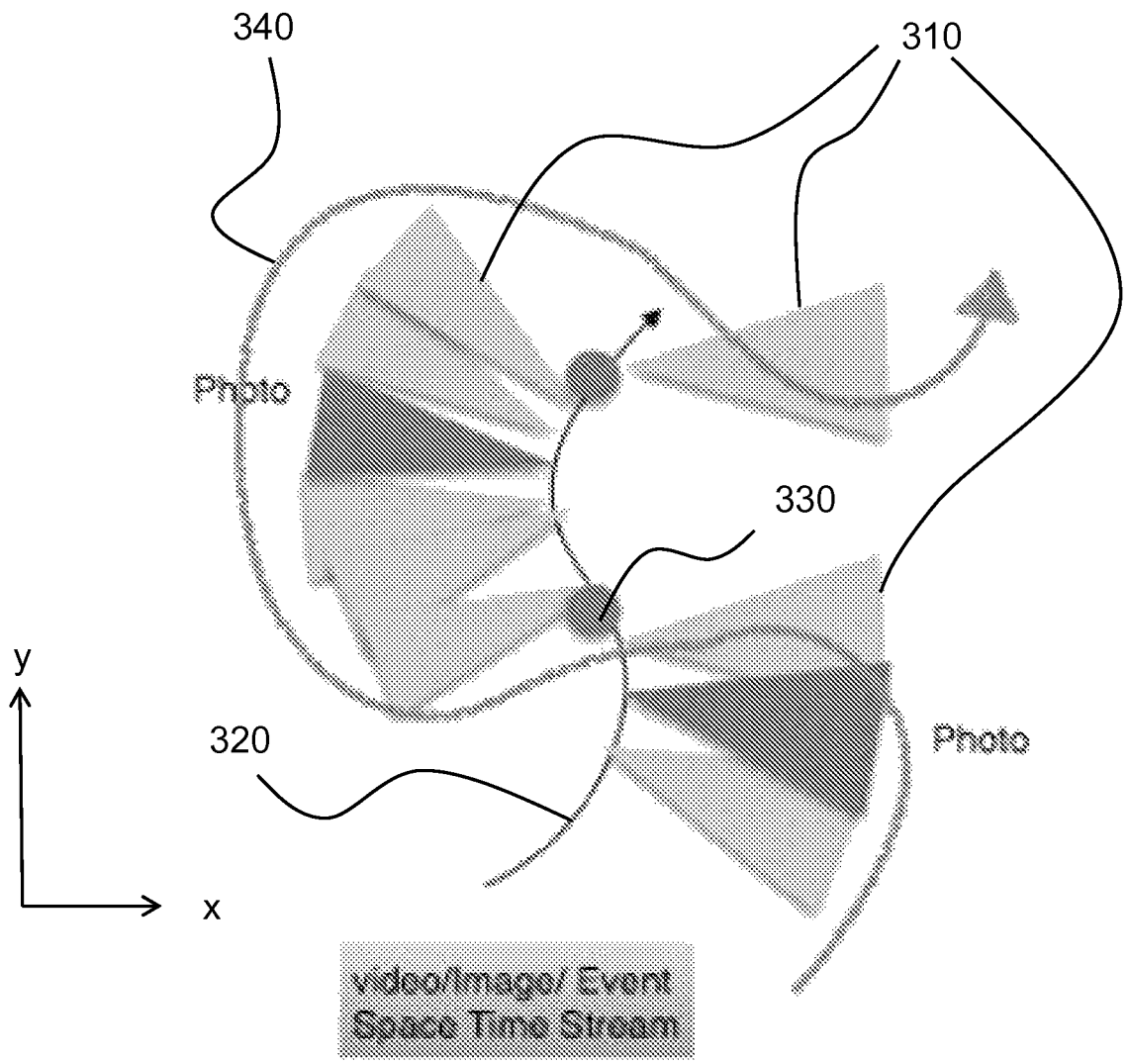
FIG. 1 shows an exemplary map of viewpoints or STVT's

Systems and methods of the invention generally relate to create real-time immersive, mediated reality environments using both live and computer produced images, sounds, graphics, and/or video, among other data. Another goal of the invention is to allow a viewer to remotely control a virtual viewpoint and to observe images and other data as would be observed from the physical equivalent of the virtual viewpoint, even if there is no real data being collected at the equivalent real viewpoint. Systems and methods of the invention are also concerned with allowing virtual participants to interact with live venues and events. In certain embodiments, the invention provides immersive experiences which more closely resemble reality (e.g., photo-realistic images and video, 3D images and video, directional and surround sound) where a virtual participant can virtually explore a live venue with freedom, seeing actual events, as they happen, hearing live sounds, and interacting with other users who may be either virtually or physically present at the venue or event.

Systems and methods of the invention may use data (e.g., images, video, audio, location, orientation, and other sensors) collected at a real venue by dedicated data collectors 103 as well as from computing devices of users at the venue, acting as data collectors 103 to build a 3D computer model (global model) of the physical space and map the location and orientation at a given time (i.e., viewpoint) for real participants, virtual participants, data collectors 103, effect objects, and real objects. The real and virtual viewpoint information of real participants and data collectors 103 (including the computing devices of real participants) at the physical space can be received over a communication network 517 by the server and may be stored in its memory 307 or in a data storage device 527. This viewpoint information may be referred to herein as a user's space/time viewpoint trajectory (STVT). The server 511 may create and provide real-time virtual images for virtual viewpoints, in real-time, as requested by computing devices of virtual participants 101 by extrapolating data from data collectors 103 with real viewpoints that intersect with the requested virtual viewpoint. The virtual participant's virtual viewpoint can therefore be presented even if there is not a data collector 103 with a real viewpoint exactly corresponding to the requested virtual viewpoint. The virtual participant is accordingly free to choose almost any viewpoint as they move, virtually, around the real venue or event, providing a more realistic, immersive, and rewarding experience.

Figure 2:
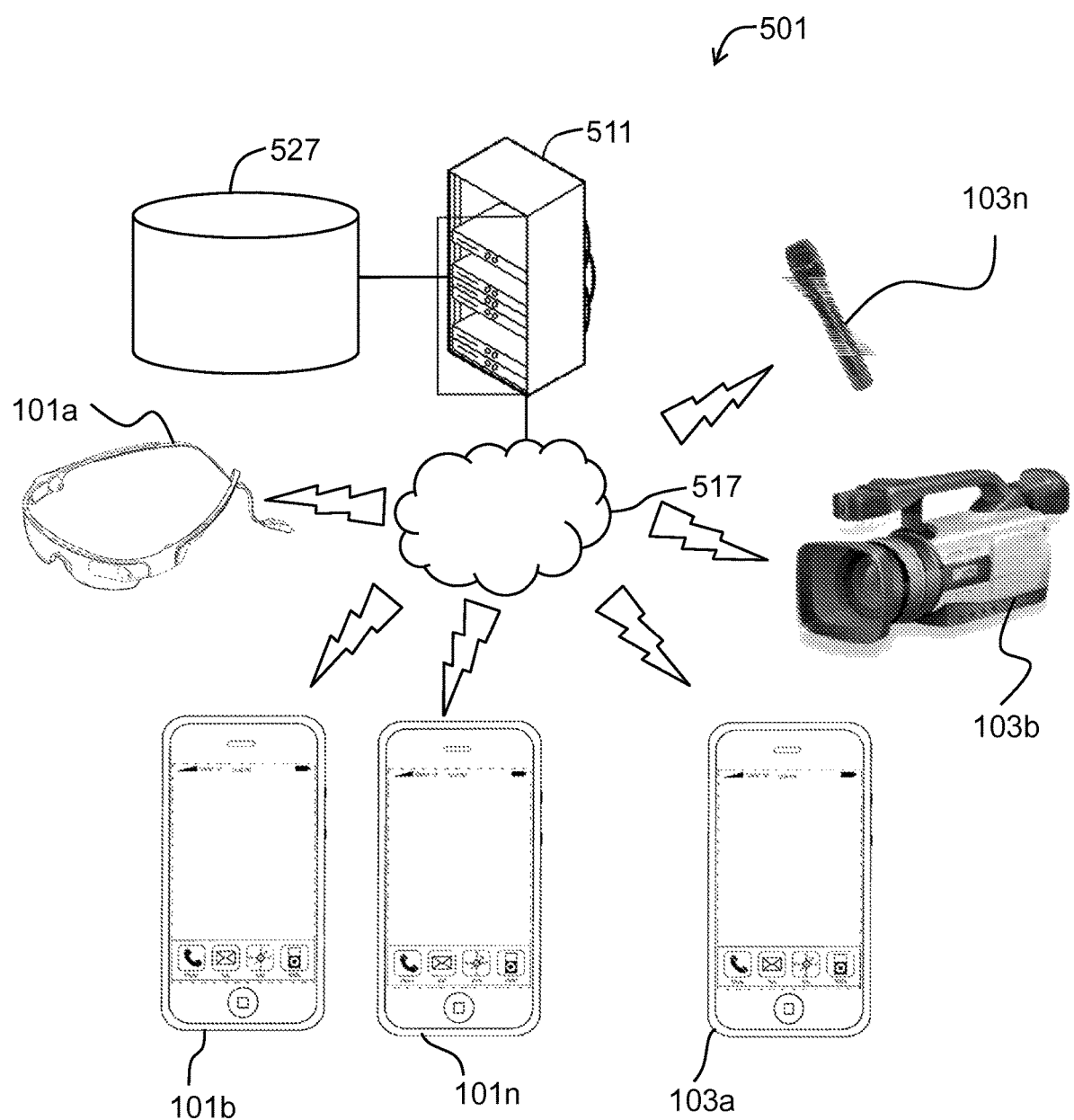
FIG. 2 shows an exemplary system of the invention.

Real-time data may include real-time biometric information for real and/or virtual participants including, for example, temperature, heart rate, breathing rate, pupil dilation, perspiration rate, brain activity (e.g., EEG monitoring), or bodily concentration of an analyte. Analytes may include oxygen (e.g., through pulse oximetry), glucose (e.g., through known glucose monitors), alcohol, THC or other drugs and/or drug markers. Analyte concentration may be measured in bodily fluids such as sweat, blood, saliva, or urine or in a real or virtual participant's breath (e.g., through a breathalyzer). Sensors for measuring these parameters are known. Sensors for collecting real-time biometric information from real and/or virtual participants may be in communication with computing devices 101 of the participants (e.g., smart phones and other mobile devices) and/or may be in direct communication with the server computer system 511. FIG. 2 illustrates an exemplary server computer system 511 implemented system 501 of the invention. Multiple data collectors 103a, 103b, . . . 103n may be in communication with the server computer system 511 via a communication network 517. Data collectors 103a, 103b, . . . 103n may include, for example, a microphone 103n, a video camera, 103b, or a computing device 103a(e.g., a mobile telephone) at the physical venue. The server computer system 511 may receive data (e.g., real viewpoint information and real-time images or other data) from the data collectors 103a, 103b, . . . 103n at a physical venue. The server computer system 511 may store data, including viewpoint information or real and virtual data from data collectors 103a, 103b, . . . 103n in memory or a data storage device 527 coupled to the server computer system 511. The server computer system 511 can generate virtual viewpoints, real-time virtual images, and other virtual data and cause this data to be reproduced on the computing devices of virtual participants 101a, 101b, . . . 101n which are in communication with the server computer system 511 through the communication network 517. The computing devices of virtual participants 101a, 101b, . . . 101n can include, for example, a mobile telephone 101 b, n or a 3d display headset 101a. The computing devices of virtual participants 101a, 101b, . . . 101n may send virtual viewpoint information to the server computer system 511 through the communication network 517.

Figure 8:
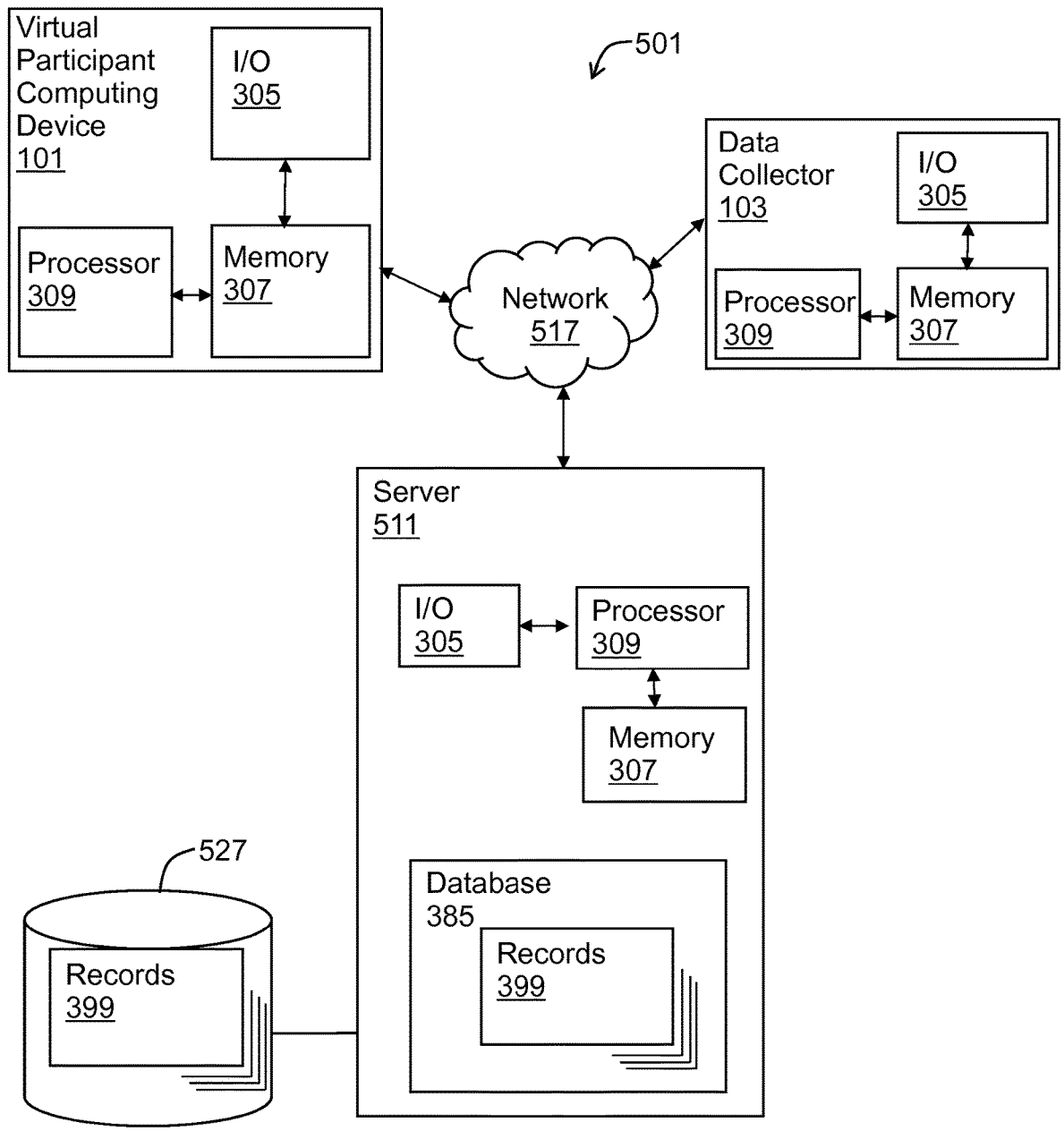
FIG. 8 gives a more detailed schematic of components that may appear within a system.

FIG. 8 gives a more detailed schematic of components that may appear within system 501. System 501 preferably includes at least one server computer system 511 operable to communicate with at least one computing device of a virtual participant 101 and at least one data collector 103 via a communication network 517. Server 511 may be provided with a database 385 (e.g., partially or wholly within memory 307, storage 527, both, or other) for storing records 399 including, for example, real and virtual viewpoints or STVT's, images and other data (e.g., real-time, real-time virtual, archived), and global models of venues where useful for performing the methodologies described herein. Optionally, storage 527 may be associated with system 501. A server 511 and a computing device of a virtual participant 101 according to systems and methods of the invention generally includes at least one processor 309 coupled to a memory 307 via a bus and input or output devices 305. A data collector 103 generally includes a processor 309 coupled to a memory 307 via a bus and a sensor (e.g., optical, vibration, and audio) equipped as an input/output device 305.

Figure 10:
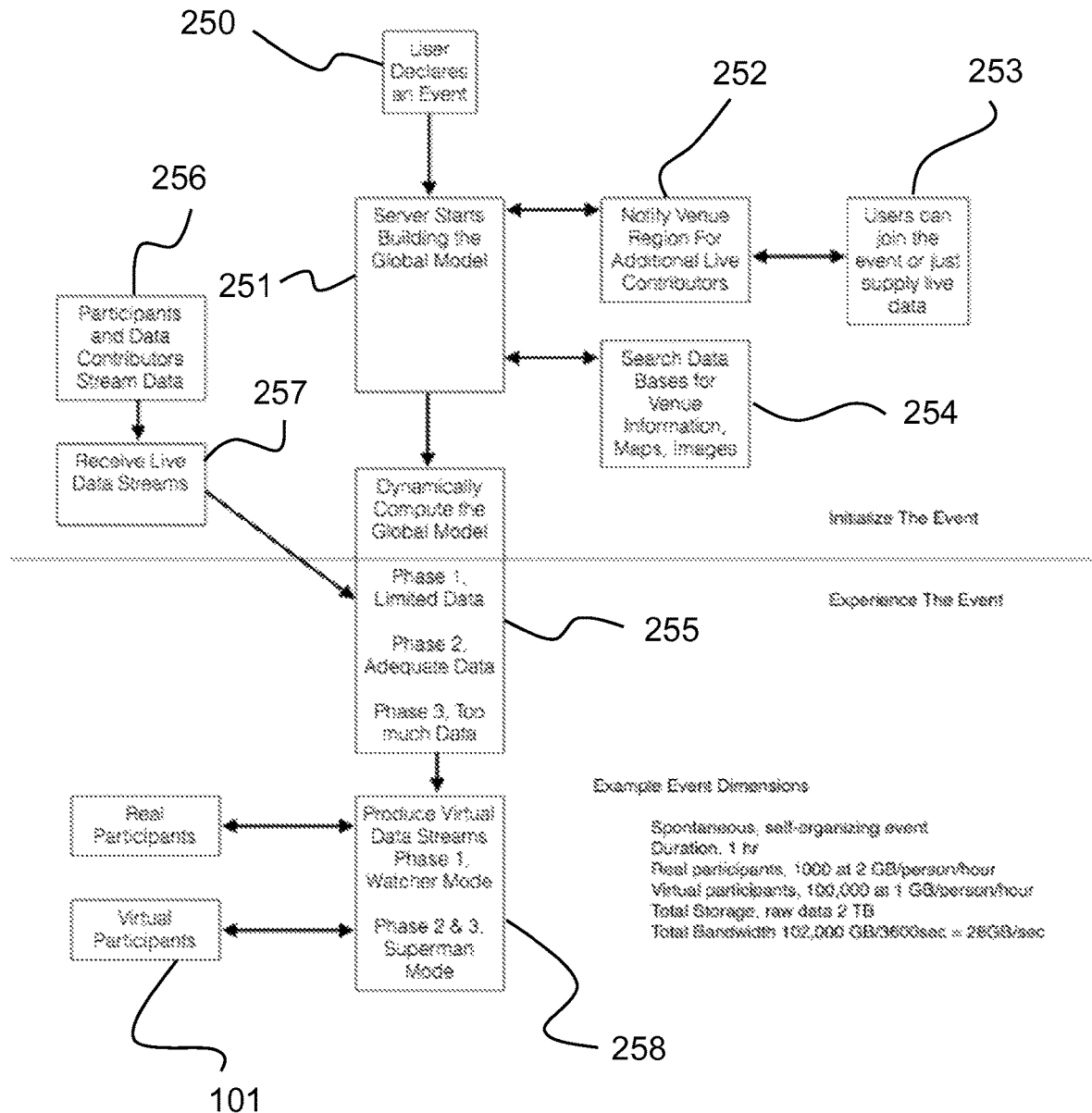
FIG. 10 provides an example of steps of methods to create an immersive, mediated reality environment corresponding to a live event.

FIG. 10 diagrams methods of certain embodiments of the invention involved in creating a real-time, immersive, mediated reality environment for a live event at a physical venue. Methods of such embodiments may include a user declaring an event 250 wherein a user may transmit information regarding an even to a server computing system 511 through the user's computing device via a communication network 517. Upon receiving the event information (e.g., time and location of event), the server computer device 511 may begin building a global model of the event venue 251. The server 511 may notify the venue region of the event 252 seeking users willing to provide additional data by participating in the event or just attending the event and performing as data collectors 103 253. Notification can include e-mail, text message, or messaging through a dedicated portal and can be sent to registered users with geographic locations within a selected range of the event location. The server computer system 511 may store this user information in its memory or on a data storage device 527. The server 511 can search databases for information on the venue 254 (e.g., maps, diagrams, dimensions, images, and video) in order to pre-build a model of the venue and to access and store archived data which may be used to supplement virtual pixel information or other virtual data where there is not sufficient real-time images or other data from data collectors 103 to create an acceptable real-time virtual image. The server 511 can then compute the global model of the venue 255 by receiving and cataloging the real viewpoint information for data collectors 103 at the venue and calculating the data coverage enabled by those real viewpoints. Data collectors 103 can stream data 256 to the server computer system 511, including their real viewpoint information. The server 511 can then receive real-time images and other data 257 from the data collectors 103 on an as needed basis to fulfil virtual viewpoint requests from the computing devices of virtual participants 101. The server computer system 511 can use the streaming data from data collectors 103 to produce streams of real-time virtual images and other data 258 which it can then communicate to the computing devices of virtual participants 101 and real participants.

Figure 7:
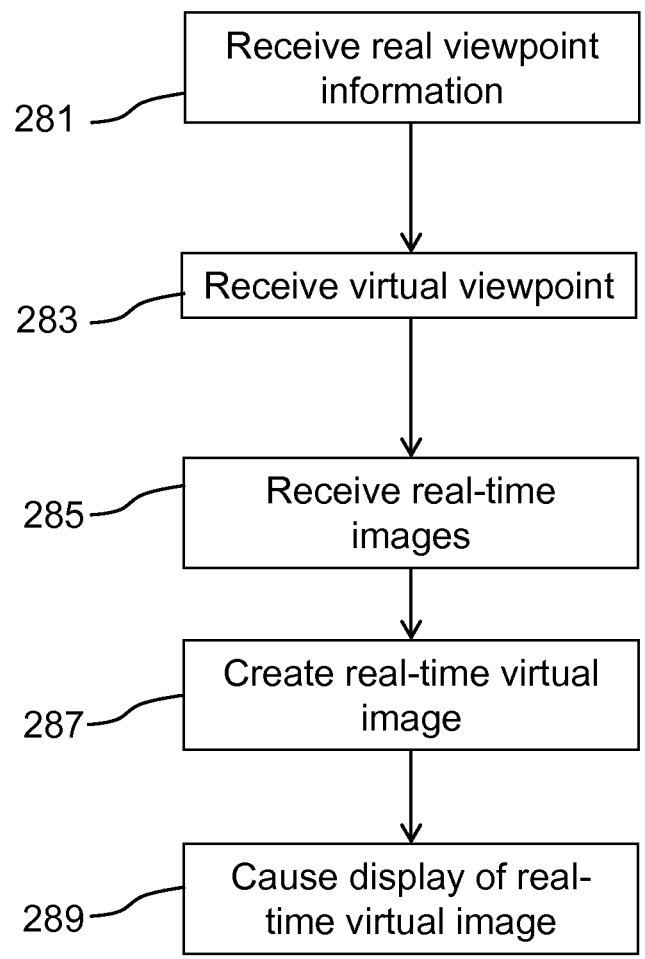
FIG. 7 diagrams steps of methods of the invention.

A diagram of steps involved in more general applications according to the invention is shown in FIG. 7. Methods of the invention may include receiving, at a server 511, real viewpoint information 281 from data collectors 103 physically present at a venue. The server 511 can then receive a virtual viewpoint request 283 from a computing device of a virtual participant 101. The server may receive real-time images 285 from data collectors 103 at the venue with real viewpoints that intersect with the requested virtual viewpoint and provide information about pixels 151 (image components) that would be visible from the requested virtual viewpoint. The server can use the pixel 151 information from real-time images to create a real-time virtual image 287 providing a photo-realistic image as would be seen from the requested virtual viewpoint. The server may then cause the computing system of the virtual participant 101 to display the real-time virtual image 289. Multiple real-time virtual images may be chronologically displayed to create real-time virtual video.

In certain embodiments, a data collector 103 may share the physical, real viewpoint that is exactly equivalent to a requested virtual viewpoint in which case the server 511 may directly transmit the real-time image from the data collector 103 to the requesting virtual participant. In some embodiments, there may be no data collector 103 at the equivalent real viewpoint to the requested virtual viewpoint. A server 511 may then refer to a global model or map of, for example, real and virtual viewpoints for virtual participants, data collectors 103, effect objects, and real objects and how they relate to each other and the venue. The server 511 can construct this global model from information regarding a venue which it may obtain from sources over the communication network 517 or from databases stored in its memory 307 or a coupled storage device 527. Once the model is constructed, the server 511 can identify data collectors 103 with real viewpoints that intersect the requested viewpoint or otherwise provide information regarding the data (e.g., image, sounds, and vibrations) that might be observed from the virtual viewpoint. For example, a virtual viewpoint may provide a certain perspective view of an object. The server 511 may pull real-time images from data collectors 103 which offer views of the object from other perspectives. The server can build a 3d model of the object and resolve the model into pixels. The server may determine pixel 151 size according to factors such as required resolution for the real-time virtual image which may be based on the display resolution of the computing device of the virtual participant 101. The server may request, receive, and store resolution and other information regarding the computing device of the virtual participant 101. These pixels are described as virtual because there is not a real-time image exactly describing them. The virtual pixels may constitute a real-time virtual image. A virtual video feed may include an array of these virtual pixels over time. The server 511 can correlate these virtual pixels to real pixels from real-time images of them from alternative viewpoints. The server may then use information from these pixels to compile information for each virtual pixel. The number of real-time images and data collectors 103 used to create a real-time virtual image can vary. Methods of creating virtual viewpoints and virtual images corresponding to those viewpoints based on real images from intersecting real viewpoints are known and are used in products including freeD™ (Replay Technologies, Inc., Newark, Ca). In certain embodiments, redundant data can provide more accurate information regarding a virtual pixel 151 and may be exploited for improved image quality, better resolution, better color fidelity, higher dynamic range and minimum quantization artifacts. Real-time virtual images may be enhanced and augmented through processes which are integrated with the pixel 151 computation for better quality and performance than possible with chained post-processing.

Figure 4:
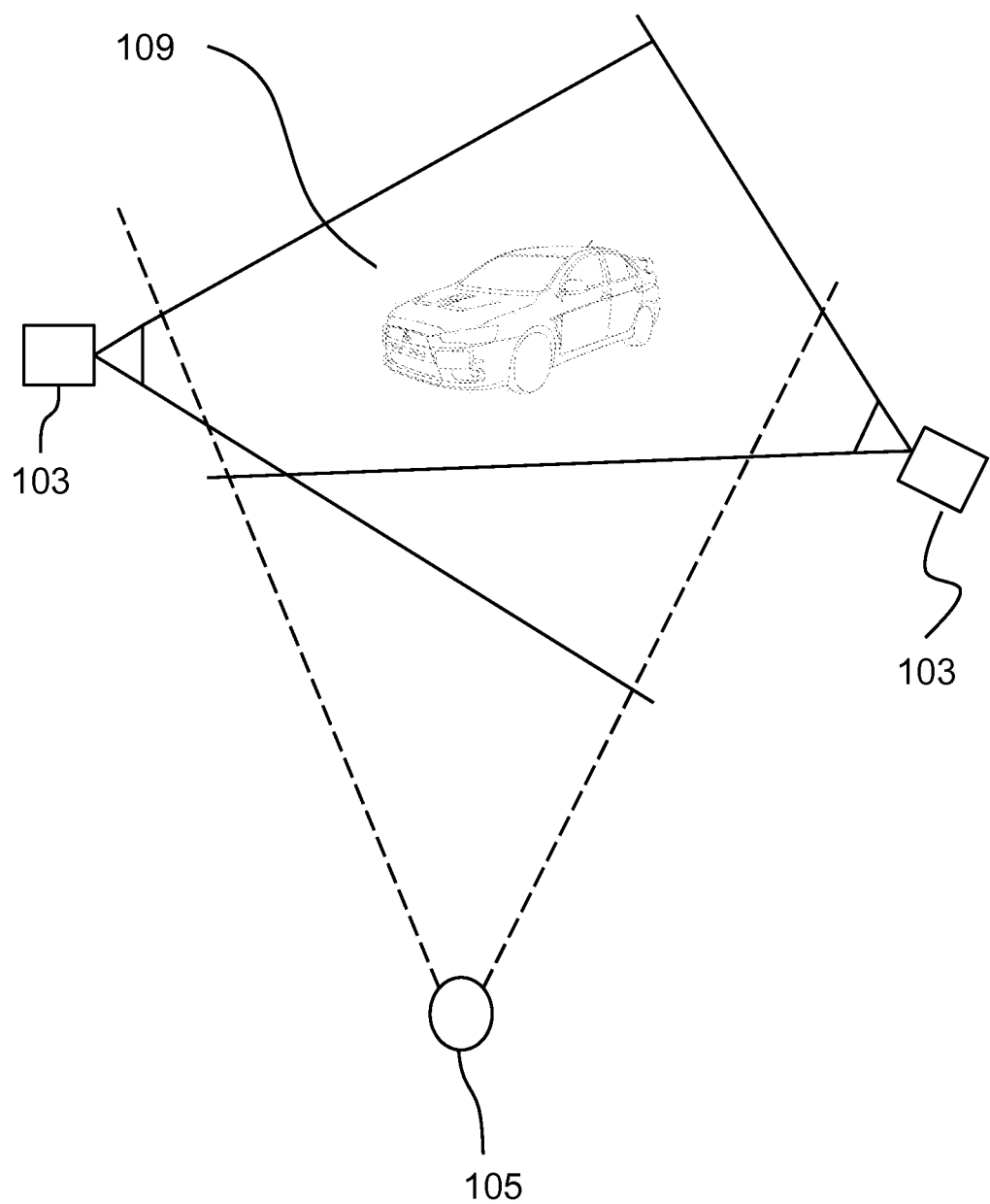
FIG. 4 illustrates exemplary real and virtual viewpoints in relation to each other and a real object.

FIG. 4 illustrates an aspect of real-time virtual image creation. Data is being collected about a real object 109 by two data collectors 103, in FIG. 4, these are video cameras. The server computer system 511 may receive and record real viewpoint data for the two data collectors 103. This real viewpoint data can consist of their position relative to each other and the object 109 as well as their orientation, or the field of view for the video camera data collectors 103 which is indicated in FIG. 4 by the solid lines extending from the data collectors 103. The server 511 may also receive virtual viewpoint information from a virtual participant and plot the location of the virtual viewpoint 105 in relation to the object 109 and the data collectors 103. In FIG. 4, the virtual viewpoint's 105 field of view and orientation is indicated by the dashed lines extending from the virtual viewpoint 105.

Figure 5:
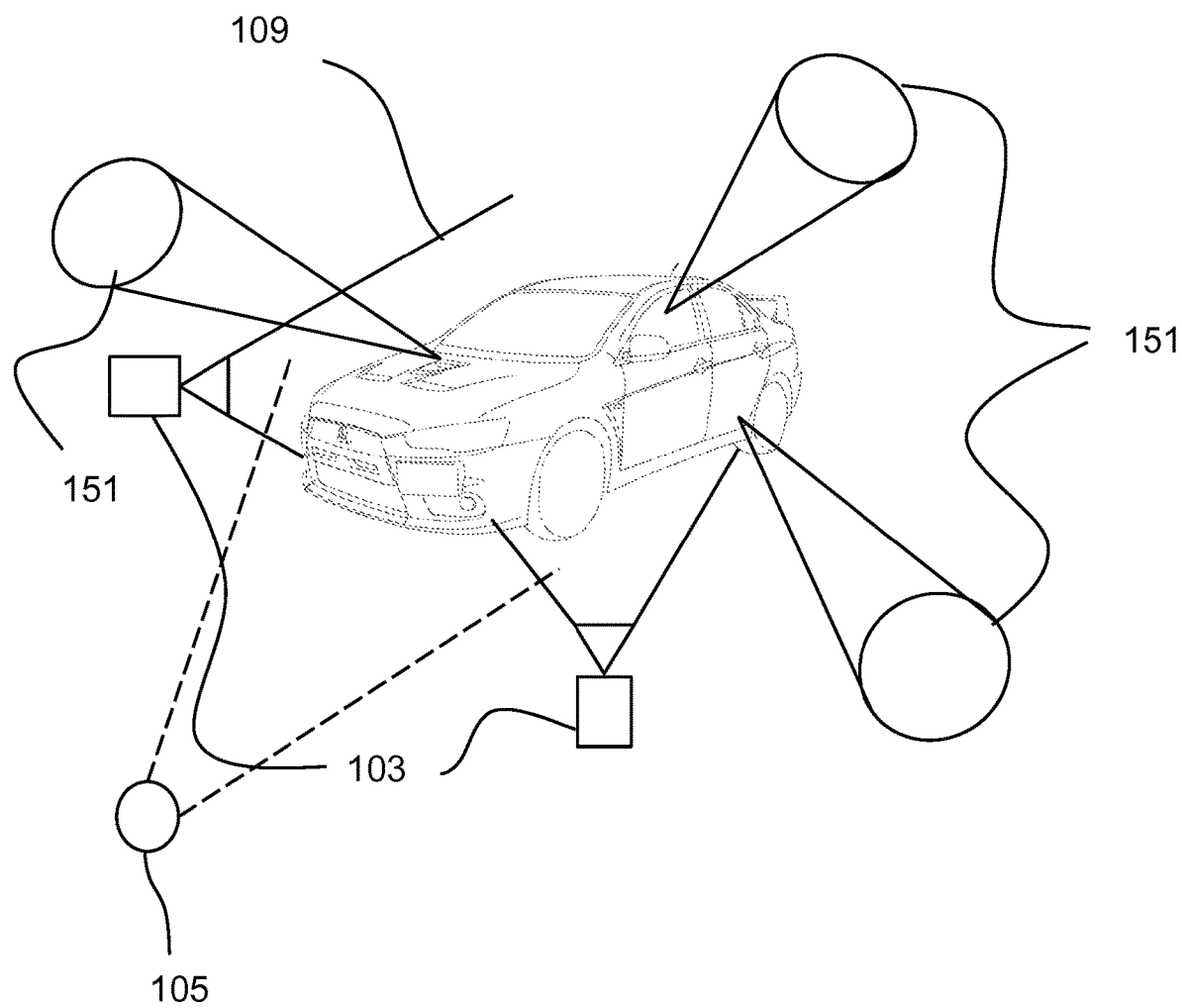
FIG. 5 illustrates exemplary real and virtual viewpoints in relation to each other and a real object being resolved into a real-time image comprising pixels.

A server computer system 511 may determine objects 109 which may be seen from a requested virtual viewpoint 105 as illustrated in FIG. 5. The server 511 may then determine data collectors 103 with real viewpoints that intersect with the requested virtual viewpoint 105. The server 511 can then break the real-time virtual image visible from the requested virtual viewpoint 105 down into component pixels 151, and match the location of those component pixels 151 to real-time images received by server computer system 511 from data collectors 103 with real viewpoints that capture those pixels 151. The server 511 can then use the pixel 151 information from the real-time images along with the real and virtual viewpoint 105 information to calculate virtual pixel 151 information (e.g., color, brightness, and contrast) that would make up the real-time virtual image corresponding to the requested virtual viewpoint 105.

Data collectors 103 may include computing devices (e.g., mobile devices such as smart phones and tablets, wearable devices, 3D headsets, or augmented reality devices) of users physically present at the venue. Data collectors 103 may include any sensor (e.g., a still or video camera, a microphone, an accelerometer, gyroscope, Global Positioning System (GPS) or other location sensor, or a vibration, temperature, pressure, light, radar, wind, sonar, infra-red, or other sensor) at the physical venue capable of collecting and transmitting information about the venue to the server 511 over a communications network 517. In certain embodiments, the server 511 may recruit live data feeds from the computing devices of real participants at the venue, effectively turning their computing devices, and the sensors coupled thereto, into data collectors 103. System and methods of the invention may thereby enable ad-hoc creation of immersive environments without requiring extensive planning and preparation or limiting immersive experiences to certain preselected and prepared venues (e.g., sporting arenas or concert venues). The systems and methods of the invention can permit individual users to set up a real-time, immersive, mediated reality event or venue in almost any location (e.g., on a hike in a park or at a party). Systems and methods of the invention can be applied to a variety of data depending on the available real-time data from data collectors 103 and the types of output devices coupled to the computing devices of virtual participants 101. For example, a data collector 103 may generate wind, temperature, and vibration data for its real viewpoint and the server 511 may then determine the appropriate wind, temperature, and vibration data observable from a requested virtual viewpoint. The server may then transmit this information to the computing device of a virtual participant 101 wherein the computing device may use a coupled directional fan, thermostat, and haptic clothing to reproduce the wind, temperature, and vibrations that would be felt at the physical equivalent of the virtual viewpoint.

In certain embodiments, the server 511 tracks the real-time viewpoint of each data collector 103 at a venue and may pull real-time data (e.g., real-time images, video, and audio) from one or more of the data collectors 103 with real viewpoints that intersect with the requested virtual viewpoint. FIG. 1 shows a 2d representation of a real STVT or real viewpoint over time where the x and y directions correspond to latitude and longitude. A data collector 103 (e.g., a real participant or other user with a mobile computing device) is mapped in 2 dimensions as it moves over time. Viewpoint information can also include orientation information 310 which shows the angle at which data was being collected by the data collector 103 (e.g., in the case of a video camera, the direction in which the camera was facing or the camera's field of view at a certain time point). A server 511 of the invention may record the location, over time, of the data collector 103 resulting in a trail 320. Viewpoint over time or STVT information can also include elevation and other location or orientation data for the data collector 103 (not shown) in order to create 3d viewpoint information. In various embodiments, the server 511 may be continuously receiving real-time data from all data collectors at a venue or, in other embodiments, may only receive real-time data from data collectors 103 as needed to create a specific real-time virtual image requested by a virtual participant through their computing device 101. The server 511 can then use this information to calculate the pixel 151 information (e.g., color and light values) for an image that would be visible from the virtual viewpoint and create that virtual image based on pixel 151 information from the real-time data it has received from data collectors 103. This process can be implemented in real-time so that a virtual participant may request and observe (e.g., see, hear, and feel) a live data feed at a remote event from virtual viewpoints even though there is no data collector 103 with the equivalent real viewpoint.

A virtual participant can be any individual experiencing a venue or event through an immersive, mediated reality environment on a computing device. A virtual participant may be in a remote location relative to the physical venue or can be at the physical venue, effectively being both a real and virtual participant.

Systems and methods of the invention can provide effect objects (described below) which can augment and improve the quality of a real participant's experience. For example, an individual stuck at the back of a crowd at a concert, unable to see the action on stage, may obtain a better view as a virtual participant, untethered from the physical limitations of the real event. Real viewpoint information may include latitudinal and longitudinal coordinates, elevation, field of view, and orientation of a data collector 103 (e.g., the direction that the data collector 103 is facing and its angle) or other objects physically located at the venue. Virtual viewpoints can also comprise latitudinal and longitudinal coordinates, elevation, field of view, and orientation which correspond to an actual location and orientation in the real, physical world.

In certain embodiments, a server 511 may receive information from a computing device of a virtual participant and may compute a virtual STVT or viewpoint for that user where the virtual viewpoint. In some instances, the virtual viewpoint may be determined by the virtual participant's computing device and, in turn, sent to the server 511 as a request for an image corresponding to that viewpoint. A virtual viewpoint may be selected by a virtual participant through a variety of interfaces including computing input devices such as a keyboard, mouse, touchscreen, gestural device, microphone, display headsets, or other wearable devices. Virtual viewpoint selection can entail entering an address or venue name into a computing device or may include moving a computing device such as a mobile telephone or display headset wherein the virtual viewpoint moves according to the movements of the computing device (e.g., a 3-d visor where a virtual participant's head and eye movements are tracked and the virtual viewpoint changes to match where the virtual participant is looking).

In some embodiments, a physical or virtual participant may send their viewpoint information to another user (e.g., another virtual participant) who may then instantly jump to that virtual viewpoint on their computing device 101.

In certain embodiments, the computing device of a virtual participant may include location and or orientation sensors such as a GPS, accelerometers, and gyroscopes which may be used by the computing device or the server to determine and track position and movements of the computing device. The virtual viewpoint for the computing device may change according to this information. For example, a virtual viewpoint on the display of a mobile device may track the device's movements so that a virtual participant can point the device toward the object or view they would like to see and the displayed perspective or viewpoint can change to match the orientation of the device.

Figure 3:
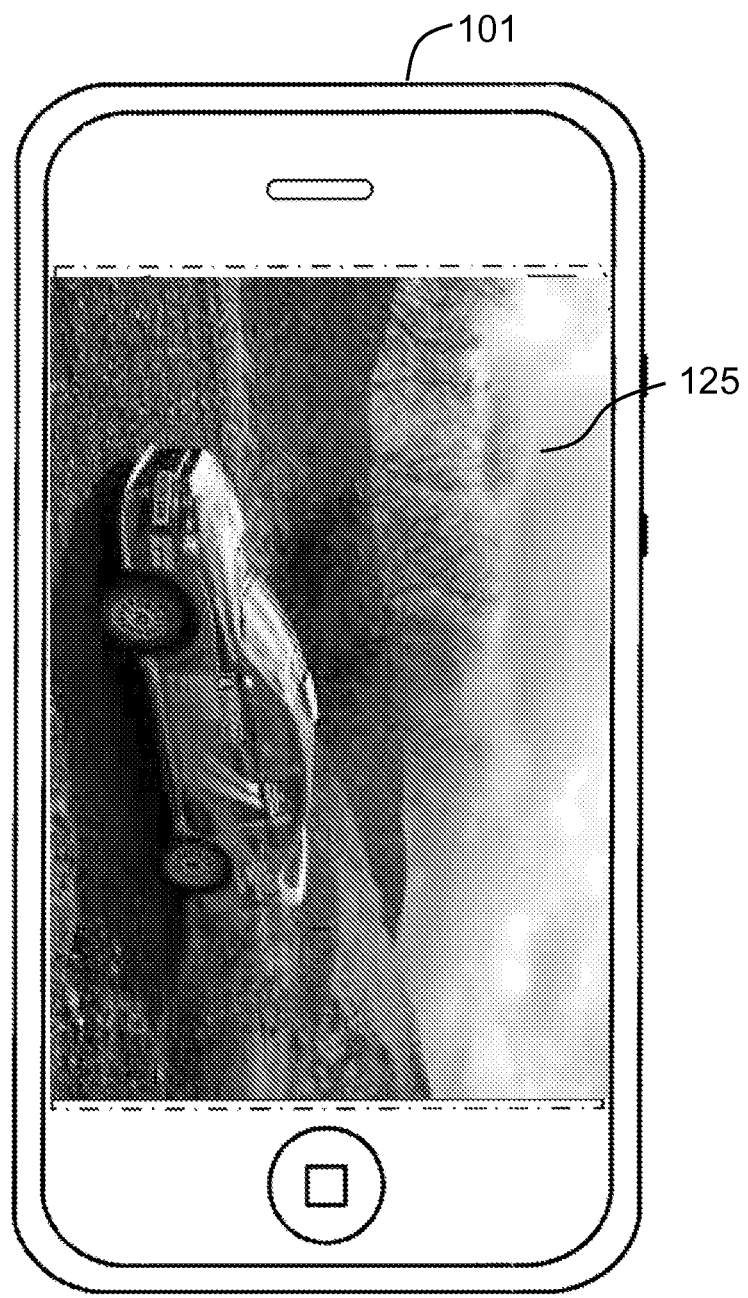
FIG. 3 shows an exemplary real-time virtual image displayed on a virtual participant's computing device.

FIG. 3 shows an exemplary computing device of a virtual participant 101 comprising a display 125 which is showing a real-time virtual image which has been received from a server computer system 511 which has generated the real-time virtual image for a virtual viewpoint received from the computing device of a virtual participant 101 based on real-time images received from data collectors 103 at the venue with real viewpoints that intersect with the virtual viewpoint.

The server 511, upon receiving virtual viewpoint information from the computing device of a virtual participant, may then determine if there are data collectors 103 at the real venue with real viewpoints that intersect with the requested virtual viewpoint.

In some embodiments, a computer server system may supplement virtual pixel 151 information or determine unknown virtual pixel 151 information by estimating information based on surrounding pixels with more robust information from real-time images obtained from intersecting real viewpoints. In some instances, the computer server system may access archived images from real viewpoints which intersect the requested virtual viewpoint and use archived pixels from those archived images to supplement virtual pixels for which there is insufficient information from available real-time images.

Systems and methods of the invention may also include further processing steps which may enhance the virtual image that is delivered to a virtual participant's computing device. Processing techniques may be used to improve color, brightness, shadows, and sharpness of real-time virtual images. Examples of processing steps include applying digital anti-aliasing filters, 2D or 3D digital filters, synchronizing data feeds (e.g., audio, video, or image feeds) from data collectors 103, compression artifacts, correction of object distortions caused by compiling real-time images from diverse real viewpoint angles.

Additional processing steps may include separating luminous and color data before processing each data set separately. Separate luminous data may be optimized for a required resolution and allow dynamic range enhancement and low light enhancement. Separate color data may be processed through the integration of sensor and temporal data for improved signal to noise ratios. Adaptive filters can be applied to the separate color data for smoothness and edge preservation and color features can be extracted for use in identification or classification functions wherein the server can identify or classify a real or effect object captured in a real-time, real or virtual image in order to provide information regarding that object.

In some instances, processing steps may include using correlation, adaptive functions, and geometric analysis to align and verify viewpoint information and to correlate real pixels (i.e., pixel 151 components of real-time images from data collectors 103) and virtual pixels (i.e. pixel 151 components of real-time virtual images supplied to virtual participants). In certain embodiments, real and virtual viewpoint information may not be precise enough to allow for perfect calculation and alignment and, therefore the server 511 may use the above alignment steps, among others, in order to fine tune alignments and accurately map and create virtual pixels. Tracking methods may include direct methods such as GPS, accelerometers, and scene analysis for location and viewpoint determination. Machine vision algorithms and color signature analysis may be used to supplement this STVT information. The use of correlation techniques may further refine the accuracy of the STVT. Indirect methods can also be used and concurrent STVTs can be used to deduce viewpoints or STVT information. For example, a pair of shoes being worn by a physical participant has a concurrent STVT to his STVT, so accessing his STVT in effect tracks the shoes viewpoint as the shoes and the physical participant have viewpoints that are, to a certain degree, fixed in relation to each other. Processing steps may aid the alignment process, for example, JPEG blocking artifacts can contaminate correlations and must be removed from the data or tolerated in the correlation algorithms.

Systems and methods of the invention may use effect objects (e.g., computer generated objects and effects) to improve and augment an immersive, mediated reality experience. Such effect objects may be, for example, real, synthesized, or computer generated and can include avatars which can indicate the presence, identity, location, and/or orientation of a user virtually present at a venue or event among other information. In certain embodiments, virtual participants may select which, if any, effect objects they would like observe by inputting their preferences through their computing devices 101. Avatars may be optionally displayed by virtual participants wherein they may elect, through their computing devices 101, to move in stealth mode through the immersive environment with no avatar representing their virtual viewpoint or location information to other participants.

Figure 6:
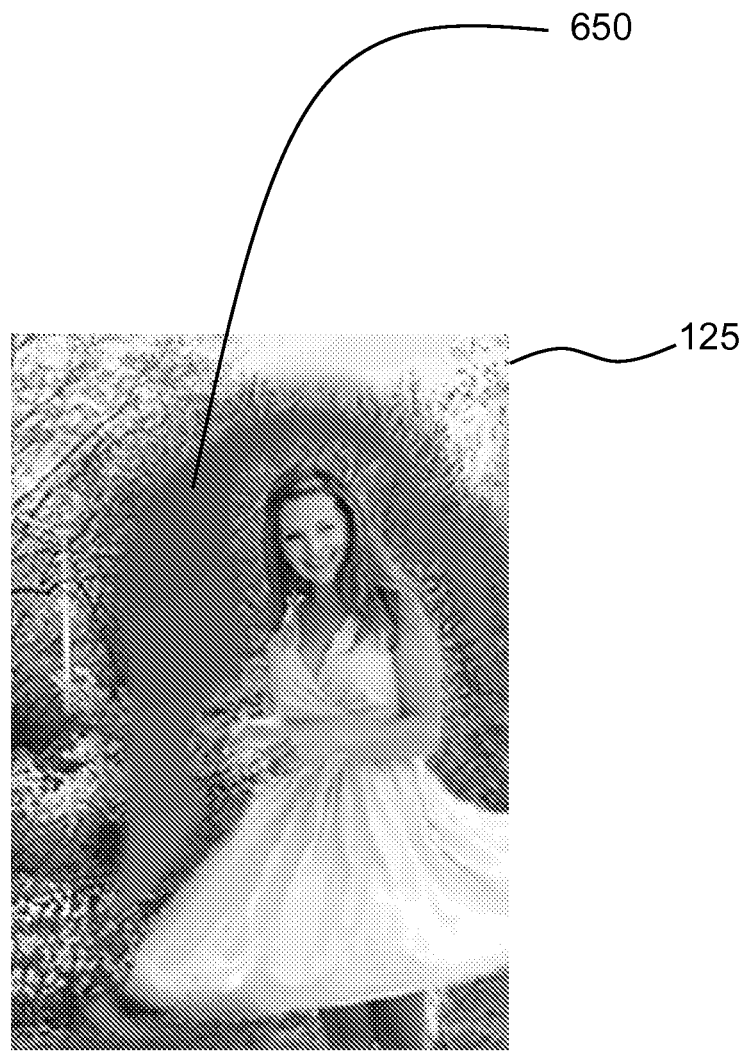
FIG. 6 shows an effect object overlaid onto a real-time virtual image as it may appear on a display of a virtual participant's computing device.

Effect objects may include transformations to an avatar or an image of a real participant as expressed in the immersive environment. Transformations may include artificial auras which may emanate from the avatars of virtual participants or the image of users physically present at the venue. These auras may be computer generated graphics which are visible in the immersive environment and may be manipulated by the individual expressing the aura to indicate his or her mood, emotion, identity, or preferences, for example. FIG. 6 shows an exemplary display 125 of a computing device of a virtual participant 101 showing an effect object 650 overlaid on a real-time virtual image, in this case, an aura. A group of similar auras may coalesce into a cloud in the immersive environment which can be used for crowd voting or to locate groups of like individuals.

In certain embodiments, transformations can include any alteration to the image, or avatar, of a virtual or real participant, including, for example, alterations to their size or proportions; transformation to resemble other individuals, animals, characters, or creatures; and/or alterations to image properties such as contrast, focus, color, or brightness. In some embodiments, transformations may include additions to the images of real or virtual participants, including images of tears or sweat, or may include changes in posture or facial expression.

Transformations may be initiated by input from a real or virtual participant through a computing device 101 including selection of a particular transformation, expression, mood, or sentiment through an input/output device 305 or may occur in response to real-time biometric data obtained from real and/or virtual participants. For example, an elevated heart rate or blood alcohol level may result in the expression of an aura of a particular color or other transformation intended to convey a physical state of the participant or user being represented.

Other effect objects may include docents, kiosks, agents, or guides which can be artificial effects or may be virtual representations of real individuals. These effects may appear to provide information about a venue, an event, an object, or a product. These effects can also facilitate the purchase of products seen in the immersive environment. For example, a virtual participant, viewing a concert may consult with an agent effect object for information about a band performing at the concert, or to download music from the band, purchase band merchandise, or facilitate virtual meetings with band members. Effect objects may include entire virtual environments (e.g., artificial buildings) which are overlaid onto the immersive environment and may be interacted with and explored in the same manner as the real objects in the immersive environment. For example, a virtual participant may step into an effect object library placed in the middle of a festival in a real world field and browse through virtual books for information before leaving walking out of the effect object library into a real-world concert as it is happening.

Effect objects can, for example, be real objects which are tracked in the immersive environment in order to support interactive experiences with real objects by virtual participants. For example, shoes being worn by an artist at a live venue may be tracked as an effect object so that a virtual participant, experiencing the concert in an immersive environment may be able to purchase or obtain information about the shoes by indicating interest in the effect object tracking them (e.g., by clicking on, looking at, zooming in on, gesturing toward, or using an touchscreen).

In some embodiments, effect objects may interact with each other, virtual participants, and real objects in the immersive environment. For example, the server computer system may plot the virtual viewpoint of an effect object such as the avatar of a virtual participant and alter the virtual pixels of the real-time virtual image being sent to the virtual participant to approximate effects of the avatar's interaction with the real objects in the immersive environment.

In certain embodiments, real-time virtual images, because they do not require data collectors 103 at the real viewpoint equivalent to the requested virtual viewpoint, may enable views which would be physically impossible to obtain real images from. For example, in some embodiments, virtual participants may explore an immersive environment from a third party perspective, viewing their real body or their virtual avatar from a third-party point of view as they interact with the immersive environment. Virtual participants may, in certain embodiments, pass through or look through effect and real objects. Additionally, processing may overcome adverse lighting conditions or other issues by enhancing real-time images to provide real-time virtual images of viewpoints where a human eye at the equivalent real viewpoint would be unable to perceive the environment around it.

Figure 9:
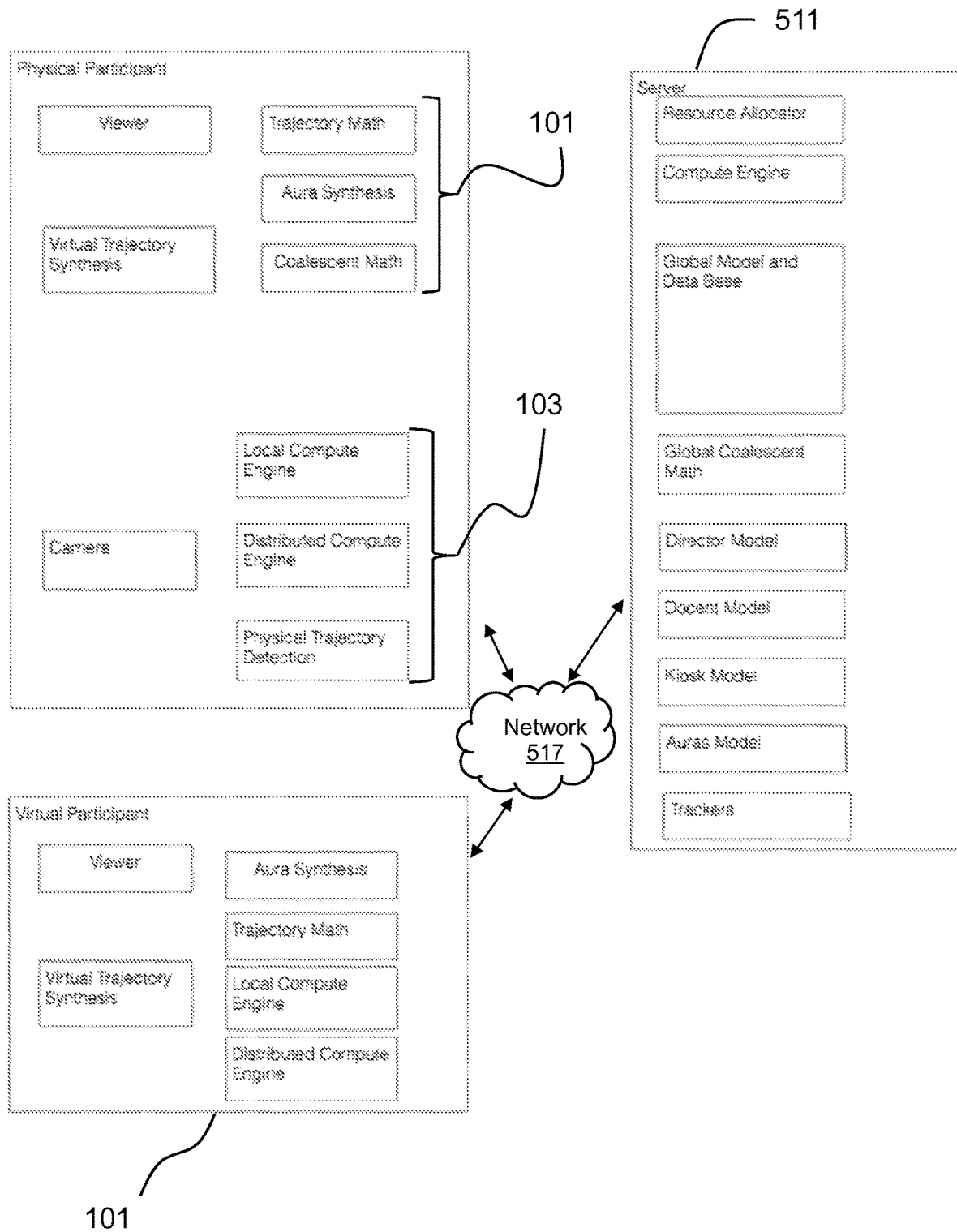
FIG. 9 gives a more detailed schematic of components that may appear within a system and their function.

FIG. 9 illustrates a more detailed schematic of the functions and operations which may be performed by the components of a system 501 of the invention. System 501 may include a server computer system 511 in communication, through a communication network 517 with at least one computing system of a virtual participant 101 and a computing system of a physical participant which may act as a data collector 103 and a virtual participant computing system 101. The server 511 can include a processor 309 which can function as a resource allocator and a computational engine. The server 511 may also include a memory 307 which may store global models in a database along with information for possible effect objects including auras, coalescence of auras, directors, docents, kiosks, and trackers. A physical participant may have a computing device which can act as both a virtual participant's computing device 101 and a data collector 103 using its sensor input/output devices 305 and it's viewpoint tracking or trajectory information. The physical participant's computing device may generate real-time images through a camera and may use, for example, GPS, network triangulation, and sensors such as accelerometers and gyroscopes for physical trajectory detection to determine real viewpoint information which it may communicate to the server 511. Any networked computing devices, including that of a physical participant or the computing device of a virtual participant 101 can act as a processor to carry out any of the processing functions of the server in a distributed computing environment. Both computing devices of virtual participants 101 and physical participants can include processors 309 or local computational engines and memory 307 which may store data for effect object synthesis including auras, and coalescence of auras. Both computing systems may also include a viewer program for receiving and executing reproduction of real-time virtual images and other data received from the server 511 through the network 517. Viewer programs can case reproduction through the input/output devices 305 (e.g., speakers, haptic output devices, and display devices) of the virtual participant's computing device 101. Virtual participant's computing devices 101 can also include means of calculating a virtual viewpoint or virtual viewpoint information which may be based on inputs received from a virtual participant via an input/output device 305 (e.g., a touchscreen, keyboard, accelerometer, gyroscope, GPS or other sensor, mouse, virtual headset, and gestural or wearable device).

Images, as referred to herein may be understood to include video in that video is made up of multiple images taken at slightly progressive times. Multiple real-time images may be captured, created, and displayed in chronological order to create real-time video. As noted earlier, data collectors 103 may collect a variety of sensors capable of collecting a variety of data types including, for example, still or video cameras, microphones, accelerometers, GPS or other location sensors, or vibration, temperature, pressure, light, radar, wind, sonar, infra-red, or other sensors. The system and methods of the invention, as applied to images, may also include receiving real data from any of the aforementioned sensors and creating real-time virtual data of the equivalent type which corresponds to a requested virtual viewpoint. The computing device of a virtual participant may, where possible, output the real-time virtual data (e.g., play audio over speakers or simulate vibrations through haptic output devices including clothing).

In exemplary embodiments, real-time virtual images (or video comprising multiple images) are supplemented by real-time virtual audio. Audio may be recorded and reproduced in a variety of formats including, mono, stereo, surround-sound, ambient, or directional. Audio may also be processed or enhanced in order to reduce distortion or to highlight certain sound sources (e.g., increasing the relative volume on an artist at a concert and decreasing the relative volume of crowd noise). Virtual participants may also contribute to audio in an immersive environment through audio recording devices coupled to their computing devices. For example, the cheering of a virtual participant can be overlaid onto the audio being recorded at a live venue.

Audio Data for an event may be collected from mobile devices at the event and possibly, microphones at the event. Additionally, virtual participants may also be streaming audio. While this audio would not contain sounds from the event, it could contain reactions of the virtual participant. In certain embodiments, sharing these audio reactions with other participants can be desirable.

Audio sources, real and virtual, may be indexed by their STVTs. In certain embodiments, the viewpoints of both audio sources and audio recipients are known and tracked. It is well known that stereophonic realism can be obtained by applying delays and attenuation that correspond to the distance to audio sources, and applying attenuation combining the directional effect of the sound source and the directional response of the listener (i.e. the position of his ears).

In the case of audio from a virtual participant, his virtual location and viewpoint may provide the necessary parameters to realistically mix his audio with the real event audio.

Virtual directional, stereo, or surround audio may be computed by the server 511 based on delays in audio reception at data collectors 103 at various real viewpoints. The server may also use the viewpoint information of observable physically present audio sources (e.g., a band on stage) or virtual audio sources (e.g., audio effect objects generated by virtual participants, or sounds from docent, guides, agents, or other effect objects) to compute and synthesize real-time virtual audio for reproduction by the computing devices of virtual participants 101.

In some instances, latency values for the computing devices of virtual participants 101 may be included in the computation. These may be variable and may be unknown. Audio correlation techniques can be used to deduce the delays of each audio source. These delays may be further predicted by movements of all the participants (real and virtual) and of the sound sources using the STVT maps or indices.

In certain instances, a large number of participants could drown out the venue audio. In some embodiments, real time virtual and real audio and audio effect objects may be processed into a background sound, called a murmur, that gives a sense of crowd reaction, but does not interfere with event audio, such as musical performance. The coalescence of audio into murmurs may be analogous to the coalescence of auras into clouds.

For example if 1 million virtual participants were experiencing the same venue, and all said "Ahhh" at the same time, using conventional algorithms to process the sound would be undesirable. In certain embodiments, systems and methods of the invention may include application of an algorithm uses adaptive gain for each source, based on the number and characteristics of the participants and the event audio. The gain factors can be applied in such a way as to minimize audio distortions and, in particular, avoid unpleasant clipping.

In certain embodiments, virtual viewpoints may be requested for a selected time (e.g., an hour, day, or week prior to current time) as opposed to being real-time. In embodiments where real-time images and other real-time data are collected and stored in memory along with time information for each piece of data, a server 511 of the invention may provide historical virtual images and other data to create a historical immersive environment with which a virtual participant can interact in the manner described for real-time immersive environments. In certain embodiments, a virtual participant can backtrack through their own or another participant's trail of previous viewpoints to revisit a viewpoint. A real or virtual participant's trail may appear as a vapor trail effect object.

In certain embodiments, a user may select one or more real objects, effect objects, or a combination thereof from either real-time or historical immersive environments for rendering in 2D or 3D images using conventional 2d printing techniques (e.g., ink-jet or laser-jet printers) or using known 3d printing or additive manufacturing technologies. 3D printers are commercially available from, for example, MakerBot Industries, LLC, One MetroTech Center, 21st Floor, Brooklyn, N.Y., or Airwolf 3D, 130 McCormick, Suite 105, Costa Mesa, Calif.

An individual may, for example, view a historical immersive environment and wish to print a 3d rendering of a real participant standing next to the avatar of a virtual participant at a concert. In certain embodiments, the individual may select the objects they wish to be printed through interacting with an input/output device 305 of a computing device 101. A computing device 101 (e.g., the server 511) may translate the selected 2d or 3d images or objects from a selected real or virtual viewpoint into a digital image (e.g. jpeg, tif, or gif) or 3d printing (e.g., STL) computer file. The translated computer file may be sent to a computing device 101 of the individual that selected the images or objects for their own use, or may be used to print a 2d image or 3d model of the selected images or objects at a remote location. In certain embodiments, systems and methods of the invention relate to receiving ordering information from an individual, including shipping address and payment information in the server 511 and rendering, through a connected device such as a laser-jet, ink-jet, or 3d printer, a 2d image or 3d model of the selected image or objects. The completed 2d image or 3d model may then be dispatched to the ordering individual.

In some embodiments, a server 511 may determine a second, stereoscopic virtual viewpoint corresponding to a virtual viewpoint wherein real-time virtual images corresponding to each of the virtual viewpoints may constitute a stereoscopic image. The virtual viewpoint and stereoscopic virtual viewpoint may approximate the position of a pair of human eyes in relation to each other.

Server 511s of the invention generally include at least a processor coupled to a non-transitory, tangible memory. Similarly, computing devices of the invention generally include at least a processor coupled to a non-transitory, tangible memory. Systems and methods of the invention contemplate that the operations described as being performed by the server 511 could also be performed by computing devices of users including data collectors 103 or virtual participants in a distributed computing system.

According to systems and methods of the invention, computing devices, data collectors 103, and server computer systems 511 may be in communication with each other through a communication network 517. A communication network may include, for example, a local area network, a wide area network, the internet, a mobile telecommunications network, or a combination thereof.

Real-time, as used herein, refers generally to content which is approximately live, or streaming but should be understood to include content streamed on a delay up to several minutes.

Effect objects may include, for example, pre-existing, generated, or captured still images, audio, video, text, verbal annotations, vector graphics, rastor graphics, physical gestures or movements, sensory inputs (e.g., body temperature indicating feelings and emotions) or any combination thereof. Content may be generated or captured using an input device (described later) on a mobile or other computing device. In preferred embodiments, content is a computer file capable of being read by a computing device or server 511. A variety of known programs or applications may be used to generate or capture content and effect objects may be in a variety of known file types including, for example, MP3, WAV, AIFF, JPEG, GIF, MPEG, Quick Time File Format (QTFF), ASCII, UTF-8, MIME, .TXT, XML, HTML, PDF, Rich Text Format (RTF), and WordPerfect.

Real-time or archived virtual images and other data may have any number of effect objects including a single effect object or effect objects numbering 1, 2. Different effect objects applied to real-time or archived virtual data may be of the same or different types. For example, real-time virtual data may have a video effect object, a text effect object, and an audio effect object. In another example, real-time virtual data may include two separate image effect objects or two separate text effect objects.

In certain embodiments, data streams, including real and virtual viewpoint information, real-time and archived real and virtual images and other data may be transferred between virtual participants' computing devices 101, data collectors 103, and the server 511. According to certain systems and methods of the invention, data in these transfers may be compressed and/or encrypted using a variety of methods known in the art including, for example, the Advanced Encryption Standard (AES) specification and lossless or lossy data compression methods.

Servers 511 according to the invention can refer to a computing device including a tangible, non-transitory memory coupled to a processor and may be coupled to a communication network 517, or may include, for example, Amazon Web Services, cloud storage, or other computer-readable storage. A communication network 517 may include a local area network, a wide area network, or a mobile telecommunications network.

In a preferred embodiment, computing devices of virtual participants 101, data collectors 103, and other computing devices according to the invention may provide a user or real or virtual participant with an intuitive graphical user interface (GUI) enabling a user to declare and event, interact with effect objects, input data, and manipulate a virtual viewpoint.

As one skilled in the art would recognize as necessary or best-suited for the systems and methods of the invention, systems and methods of the invention include one or more servers 511 and/or computing devices that may include one or more of processor 309 (e.g., a central processing unit (CPU), a graphics processing unit (GPU), etc.), computer-readable storage device 307 (e.g., main memory, static memory, etc.), or combinations thereof which communicate with each other via a bus.

A processor 309 may include any suitable processor known in the art, such as the processor sold under the trademark XEON E7 by Intel (Santa Clara, Calif.) or the processor sold under the trademark OPTERON 6200 by AMD (Sunnyvale, Calif.).

Memory 307 preferably includes at least one tangible, non-transitory medium capable of storing: one or more sets of instructions executable to cause the system to perform functions described herein (e.g., software embodying any methodology or function found herein); data (e.g., portions of the tangible medium newly re-arranged to represent real world physical objects of interest accessible as, for example, a picture of an object such as a world-conquering, high performance, all-wheel drive sports sedan); or both. While the computer-readable storage device can in an exemplary embodiment be a single medium, the term "computer-readable storage device" should be taken to include a single medium or multiple media (e.g., a centralized or distributed database, and/or associated caches and servers) that store the instructions or data. The term "computer-readable storage device" shall accordingly be taken to include, without limit, solid-state memories (e.g., subscriber identity module (SIM) card, secure digital card (SD card), micro SD card, or solid-state drive (SSD)), optical and magnetic media, hard drives, disk drives, and any other tangible storage media.

Any suitable services can be used for storage 527 such as, for example, Amazon Web Services, memory 307 of server 511, cloud storage, another server, or other computer-readable storage. Cloud storage may refer to a data storage scheme wherein data is stored in logical pools and the physical storage may span across multiple servers and multiple locations. Storage 527 may be owned and managed by a hosting company. Preferably, storage 527 is used to store records 399 as needed to perform and support operations described herein.

Input/output devices 305 according to the invention may include one or more of a video display unit (e.g., a liquid crystal display (LCD) or a cathode ray tube (CRT) monitor), an alphanumeric input device (e.g., a keyboard), a cursor control device (e.g., a mouse or trackpad), a disk drive unit, a signal generation device (e.g., a speaker), a touchscreen, a button, an accelerometer, a microphone, a cellular radio frequency antenna, a network interface device, which can be, for example, a network interface card (NIC), Wi-Fi card, or cellular modem, or any combination thereof. Input and output devices 305 may also include haptic devices and wearable or gestural devices.

One of skill in the art will recognize that any suitable development environment or programming language may be employed to allow the operability described herein for various systems and methods of the invention. For example, systems and methods herein can be implemented using Perl, Python, C++, C #, Java, JavaScript, Visual Basic, Ruby on Rails, Groovy and Grails, or any other suitable tool. For a mobile computing device, it may be preferred to use native xCode or Android Java.

As used herein, the word "or" means "and or or", sometimes seen or referred to as "and/or", unless indicated otherwise.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A system for creating a mediated reality environment, said system comprising a server computing system comprising a processor coupled to a tangible, non-transitory memory, the system operable to:
   receive, in real-time, real viewpoint information for one or more data collectors located at a venue;
   receive a virtual viewpoint from a computing device of a virtual participant, said computing device comprising a processor coupled to a tangible, non-transitory memory;
   receive one or more real-time images from the one or more data collectors where the one or more data collectors have a real viewpoint which intersects the virtual viewpoint, said one or more real-time images comprising a plurality of real pixels;
   create, using the server's processor, a real-time virtual image comprising a plurality of virtual pixels and corresponding to the virtual viewpoint by using pixel information from the one or more real-time images; and
   cause the computing device of the virtual participant to display the real-time virtual image.

2. The system of claim 1, further operable to:
   identify, using the server's processor, one or more archived images comprising a plurality of archived pixels, said archived images having a corresponding real viewpoint which intersects with the virtual viewpoint;
   retrieve one or more of the archived pixels;
   use the one or more archived pixels to supplement the real-time virtual image using the server's processor; and
   cause the computing device of the virtual participant to display the supplemented real-time virtual image.

3. The system of claim 1 wherein the one or more data collectors comprise a microphone, said system further operable to:
   receive real-time audio data from the microphone;
   correlate the real-time audio data with the real viewpoint information for the data collector that generated it;
   create, using the server's processor, real-time virtual audio corresponding to the virtual viewpoint; and
   cause the computing device of the virtual participant to emit the real-time virtual audio.

4. The system of claim 1 wherein one or more of the one or more data collectors comprise an optical sensor.

5. The system of claim 1 wherein the real viewpoint information and the virtual viewpoint comprise a latitudinal coordinate, a longitudinal coordinate, a field of view, and an orientation.

6. The system of claim 1 further operable to:
determine a stereoscopic virtual viewpoint capable of being combined with the virtual viewpoint in order to create a stereoscopic viewpoint;
create a stereoscopic real-time virtual image corresponding to the stereoscopic virtual viewpoint; and
cause the computing device of the virtual participant to simultaneously display the real-time virtual image and the stereoscopic real-time virtual image.

7. The system of claim 1 wherein the real-time virtual image is a 3-dimensional image.

8. The system of claim 3 wherein the real-time virtual audio includes a plurality of channels.

9. The system of claim 1 further operable to:
create an effect object;
assign a virtual location to the effect object which corresponds with a physical location at the venue; and
where the virtual location is observable from the virtual viewpoint, overlay the effect object onto the real-time virtual image.

10. The system of claim 9 wherein the effect object comprises an image of a real object or a computer generated image.

11. The system of claim 9 wherein the effect object is generated by the virtual participant.

12. The system of claim 9 wherein the effect object comprises a virtual representation of a virtual participant.

13. The system of claim 9 wherein the effect object may be manipulated by the virtual participant.

14. The system of claim 1 wherein the virtual viewpoint is manipulated through movement of the computing device of the virtual participant.

15. The system of claim 1 further operable to process the one or more real-time images using the server's processor to enhance a feature of the one or more real-time images.

16. The system of claim 15 wherein the feature is selected from the group consisting of resolution, color, brightness, contrast, signal to noise ratio, smoothness, edge preservation, luminosity, and dynamic range.

17. The system of claim 1 wherein the server's processor comprises a distributed computing system comprising a plurality of computing device processors in communication with each other through a communication network.

18. The system of claim 9, said system further operable to receive real-time biometric data for the virtual participant or a real participant from a biometric sensor;
wherein the effect object is determined by the real-time biometric data.

19. The system of claim 18 wherein the real-time biometric data is selected from the group consisting of temperature, heart rate, breathing rate, pupil dilation, brain activity, and bodily concentration of an analyte.

20. The system of claim 19 wherein the analyte is selected from the group consisting of oxygen, carbon dioxide, glucose, alcohol, and THC.

* * * * *